(12) United States Patent
Kawasumi

(10) Patent No.: US 8,702,240 B2
(45) Date of Patent: Apr. 22, 2014

(54) IMAGE DISPLAY APPARATUS

(75) Inventor: Takehito Kawasumi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 12/973,703

(22) Filed: Dec. 20, 2010

(65) Prior Publication Data

US 2011/0149207 A1 Jun. 23, 2011

(30) Foreign Application Priority Data

Dec. 22, 2009 (JP) ................................ 2009-290099

(51) Int. Cl.
*G03B 21/00* (2006.01)

(52) U.S. Cl.
USPC .................. 353/31; 353/30; 353/97; 348/752

(58) Field of Classification Search
USPC .................... 353/30, 31, 97; 348/752; 362/17
See application file for complete search history.

(56) References Cited

U.S. PATENT DOCUMENTS

| | | | |
|---|---|---|---|
| 7,156,520 B2 * | 1/2007 | Chigira et al. .................. | 353/20 |
| 7,878,659 B2 * | 2/2011 | Kadowaki et al. .............. | 353/38 |
| 2005/0237498 A1 * | 10/2005 | Shimizu ......................... | 353/119 |
| 2006/0066813 A1 * | 3/2006 | Okuyama et al. ............... | 353/31 |
| 2008/0013051 A1 | 1/2008 | Glinski et al. | |

FOREIGN PATENT DOCUMENTS

| | | | | |
|---|---|---|---|---|
| CN | 1932580 A | 3/2007 | | |
| DE | 19649229 A | 6/1997 | | |
| EP | 1443356 A2 | 8/2004 | | |
| JP | 3-175437 A | 7/1991 | | |
| JP | 2000206463 A | 7/2000 | | |
| JP | 2001066551 A | * 3/2001 | ............ | G02B 27/28 |
| JP | 2004061569 A | 2/2004 | | |
| JP | 2004109490 A | 4/2004 | | |
| JP | 2005283842 A | 10/2005 | | |
| JP | 2008015501 A | 1/2008 | | |

OTHER PUBLICATIONS

Machine Translation of JP2001066551A.*

* cited by examiner

*Primary Examiner* — Francis M Legasse, Jr.
*Assistant Examiner* — Jerry Brooks
(74) *Attorney, Agent, or Firm* — Canon USA Inc. IP Division

(57) ABSTRACT

An image display apparatus includes an image display element configured to display an image by controlling a polarization state of a polarized light beam. An illumination optical system guides the polarized light beam to the image display element. A polarizing beam splitter disposed between the illumination optical system and the image display element selectively splits polarization of incident light. A projection optical system projects the image displayed by the image display element onto a projection plane. The positional relationship between the polarizing beam splitter and an optical axis of the projection optical system is properly set.

30 Claims, 9 Drawing Sheets

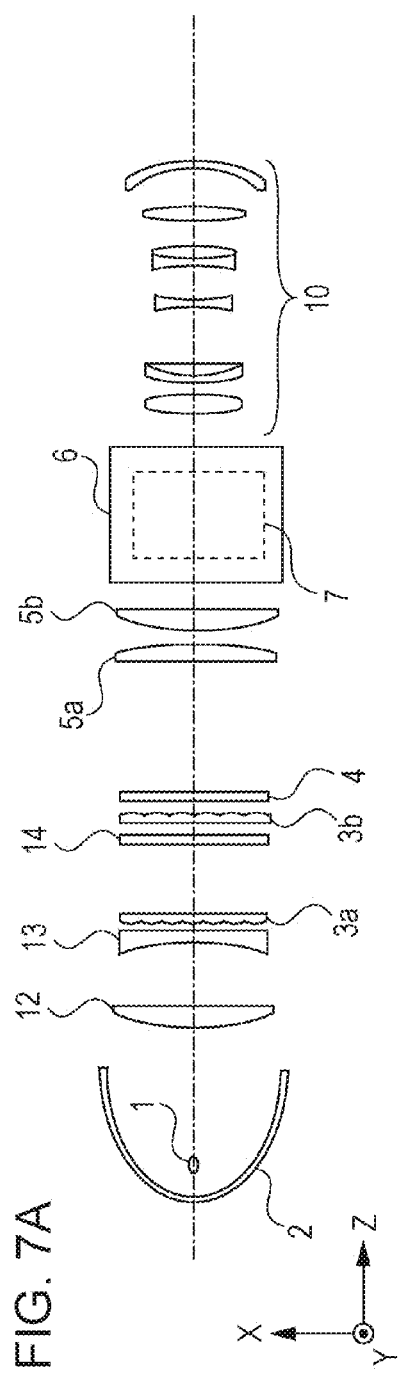
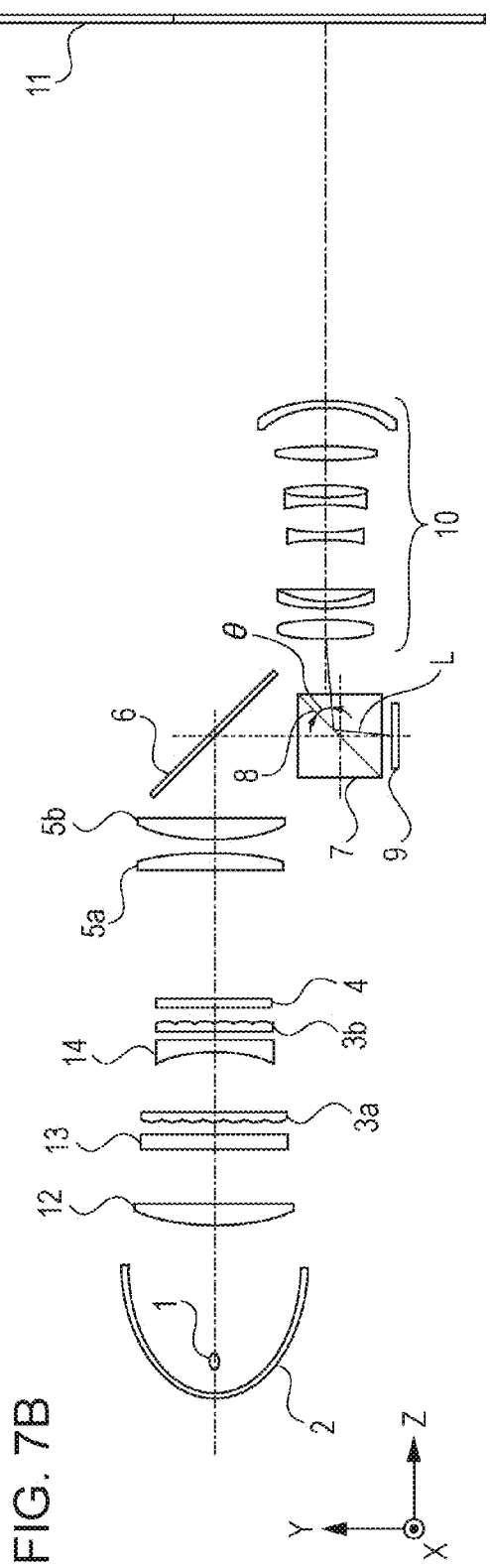

IMAGE DISPLAY APPARATUS

BACKGROUND OF THE INVENTION

1. Field of the Invention

The present invention relates to an image display apparatus and more particularly to an image display apparatus using a reflective image display element.

2. Description of the Related Art

In a known image display apparatus using a reflective liquid crystal panel (image display element), respective optical paths of light incident upon and light emergent from the liquid crystal panel need to be made different from each other. For that purpose, a polarizing beam splitter allowing P-polarized light to pass through it, but reflecting S-polarized light is arranged on the incident/emergent surface side of the reflective liquid crystal panel. The characteristic of a polarization splitting film used in the polarizing beam splitter depends on the incidence angle of the incident light. As the incidence angle of the light incident upon the polarization splitting film departs from 45° to a larger extent, leakage light from the polarization splitting film is increased and the contrast of a projected image is reduced. The term "leakage light" implies light entering a projection lens when the liquid crystal panel is driven in a mode where all pixels are displayed black.

There is known a technique of arranging a polarizer, which cuts off the leakage light, on the emergent surface side of the polarizing beam splitter in order to increase the contrast of the projected image. However, the known technique has the problem that brightness of the projected image is reduced because a polarizer has low transmittance.

SUMMARY OF THE INVENTION

The present invention provides an image display apparatus including an image display element configured to display an image by controlling a polarization state of a polarized light beam, an illumination optical system configured to introduce the polarized light beam to the image display element, a polarizing beam splitter disposed between the illumination optical system and the image display element to selectively split incident light, and a projection optical system (or a mounting portion for the projection optical system), which is configured to project the image displayed by the image display element onto a projection plane. The position of an optical axis of the projection optical system is properly set with respect to the polarizing beam splitter.

Further features of the present invention will become apparent from the following description of exemplary embodiments with reference to the attached drawings.

BRIEF DESCRIPTION OF THE DRAWINGS

FIGS. 7A and 7B are each a sectional view of an image display apparatus according to a second embodiment of the present invention.

DESCRIPTION OF THE EMBODIMENTS

Embodiments of the present invention will be described below with reference to the drawings.

First Embodiment

Figure 1:
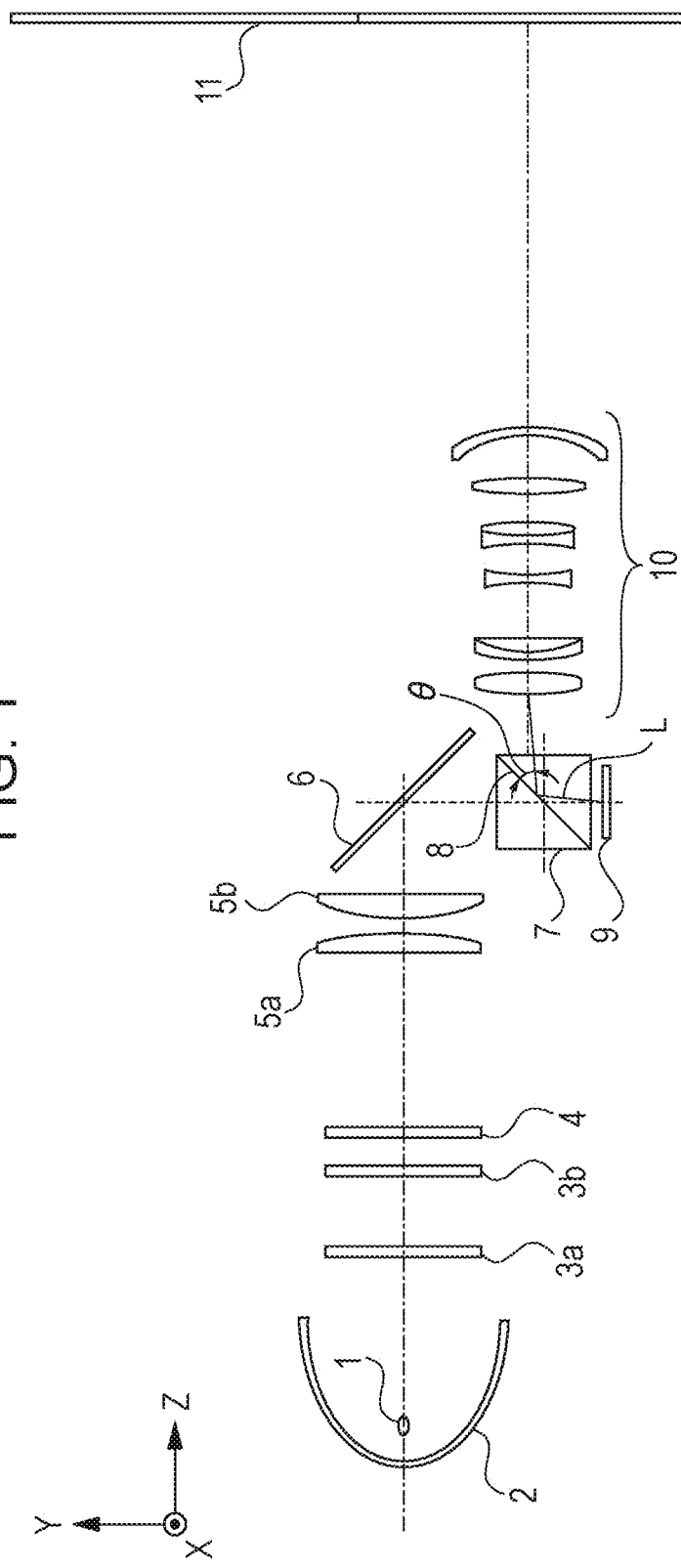
FIG. 1 illustrates an image display apparatus according to a first embodiment of the present invention.

FIG. 1 illustrates the configuration of an image display apparatus according to a first embodiment. In FIG. 1, reference numeral 1 denotes a light source. A reflector 2 reflects light emitted from the light source 1 in a predetermined direction. In this embodiment, a parabolic reflector is used as the reflector 2. A first fly-eye lens 3a is made up of rectangular lens elements which are each similar in shape to a panel and which are arranged in a matrix pattern. A second fly-eye lens 3b includes lens elements that correspond respectively to the individual rectangular lens elements of the first fly-eye lens 3a. A polarization conversion element 4 converts unpolarized light from the light source 1 to linearly-polarized light. Reference numerals 5a and 5b each denote a condenser lens, and 6 denotes a reflecting mirror. Reference numeral 7 denotes a polarizing beam splitter, and 8 denotes a polarization splitting film of the polarizing beam splitter 7. A reflective liquid crystal panel (image display element) 9 displays an image by controlling the polarization state of the incident light. Reference numeral 10 denotes a projection lens (projection optical system), and 11 denotes a screen (projection plane). The projection lens is mounted into a mounting slot (mounting portion), which is formed in a main body of the image display apparatus.

A line segment L represents an optical path of a light beam emerging from the center of the image display element and reaching a point where an optical axis of the projection lens 10 intersects an optical surface within the projection lens 10 (projection optical system), which is closest to an illumination optical system (generally, such a point is given as an apex of the lens surface of the relevant optical surface). The projection lens support (i.e., the mounting slot for the projection lens) is arranged such that an angle θ formed by the optical path L and the polarization splitting film 8 of the polarizing beam splitter 7 is smaller than 45°. The expression "angle θ formed by the optical path L and the polarization splitting film 8 of the polarizing beam splitter 7 is smaller than 45°" implies that an incidence angle and an emergence angle of a light beam propagating along the optical path L with respect to the normal to the polarization splitting film 8 is larger than 45°. Further, the "optical surface within the projection optical system, which is closest to an illumination optical system" implies, for example, a lens surface of the projection lens 10 on the side closest to the liquid crystal panel 9, or closest to the polarizing beam splitter 7.

The polarizing beam splitter 7 may have a refractive index n of 1.6 or more. The refractive index n of the polarizing beam splitter 7 used in this embodiment is 1.8. Further, a light beam emerging from the center of the liquid crystal panel 9 in a direction vertical (perpendicular) to the liquid crystal panel 9 and incident upon the polarization splitting film 8 forms an angle of 45° with respect to the surface of the polarization splitting film 8. A horizontal one-dot-chain line in FIG. 1 represents each of an optical axis of the condenser lens 5a and the optical axis of the projection lens 10. A vertical one-dot-chain line extending from the reflecting mirror 6 to the liquid crystal panel 9 represents a line normal to the liquid crystal panel 9 and passing substantially through the center of the polarization splitting film 8.

The light emitted from the light source 1 is reflected by the reflector 2 to advance as substantially parallel light, which enters the first fly-eye lens 3a. The substantially parallel light is separated into a plurality of light beams by individual lens elements forming the first fly-eye lens 3a. The plural divided light beams pass through the second fly-eye lens 3b and enter the polarization conversion element 4. The polarization conversion element 4 includes a plurality of small polarizing beam splitters each having a polarization splitting film and a half-wave plate arranged at alternate ones of emergent surfaces of the small polarizing beam splitters. Unpolarized light having entered the polarization conversion element 4 exits it after being converted to P-polarized light (i.e., a light beam in the P-polarized state). When unpolarized light is to be converted to S-polarized light, the conversion to the S-polarized light can be performed by arranging a half-wave plate on the emergent side of the P-polarized light. In that case, the liquid crystal panel 9 is arranged on the side toward which the light incident upon the polarizing beam splitter 7 is reflected. Herein, the P-polarized light and the S-polarized light are defined with respect to the polarization splitting film 8 of the polarizing beam splitter 7, which is adjacent to the liquid crystal panel (image display element) 9, rather than with respect to the small polarizing beam splitters of the polarization conversion element 4. The P-polarized light converted by the polarization conversion element 4 is introduced to the reflecting mirror 6 while being converged by the condenser lenses 5a and 5b. An optical system from the light source 1 to the condenser lenses 5a and 5b constitutes an illumination optical system that illuminates the liquid crystal panel 9 with Koehler illumination.

The converged light exiting the condenser lenses 5a and 5b is reflected by the reflecting mirror 6 to enter the polarizing beam splitter 7. The P-polarized light passes through the polarization splitting film 8 of the polarizing beam splitter 7 for illumination of the liquid crystal panel 9. The incident light is modulated by the liquid crystal panel 9, and the modulated emergent light is reflected by the polarizing beam splitter 7 to be projected onto a screen 11 through the projection lens 10 (projection optical system). A Z-axis in FIG. 1 is parallel to the optical axis of the projection lens 10, and the direction toward the screen 11 is assumed to be a + Z-direction. An X-axis is perpendicular to a plane including the Z-axis and a line normal to the polarization splitting film 8, and the direction toward the front side of the drawing sheet (as seen from the reader's point of view) is assumed to be a + X-direction. A Y-axis is perpendicular to both the X-axis and the Z-axis, and the direction toward the upper side of the drawing sheet from the lower side is assumed to be a + Y-direction.

Figure 2:
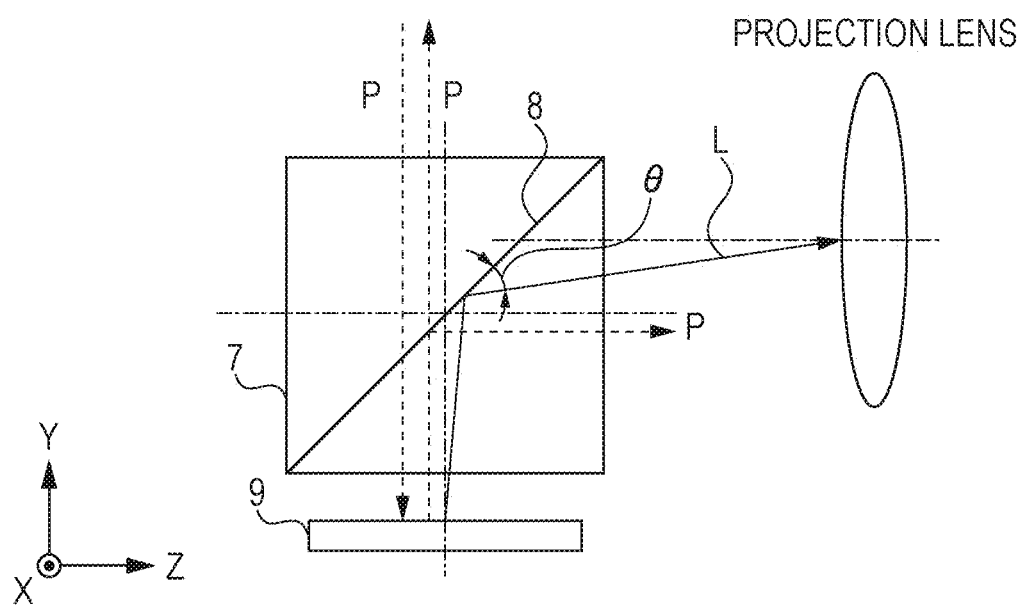
FIG. 2 is an enlarged view of a polarizing beam splitter, an image display element, and thereabout.

FIG. 2 is an enlarged view of the polarizing beam splitter 7, the liquid crystal panel (image display element) 9, and thereabout in FIG. 1. An angle θ formed by the optical path L (denoted by a solid line in FIG. 2) and the polarization splitting film 8 is smaller than 45°. Also, an arrow denoted by a broken line P represents a light beam generated in the mode where all pixels are displayed black. The P-polarized light reflected by the reflecting mirror 6 passes through the polarization splitting film 8 and enters the liquid crystal panel 9. The P-polarized light having entered the liquid crystal panel 9 is reflected as it is without being converted in the polarization direction thereof in the mode where all pixels are displayed black. The reflected P-polarized light passes through the polarization splitting film 8 again and returns to the light source side. Most of the reflected P-polarized light returns to the light source side due to the characteristic of the polarization splitting film 8. However, some of the reflected P-polarized light is reflected by the polarization splitting film 8 to enter the projection lens 10 in spite of being the P-polarized light.

Figure 3A:
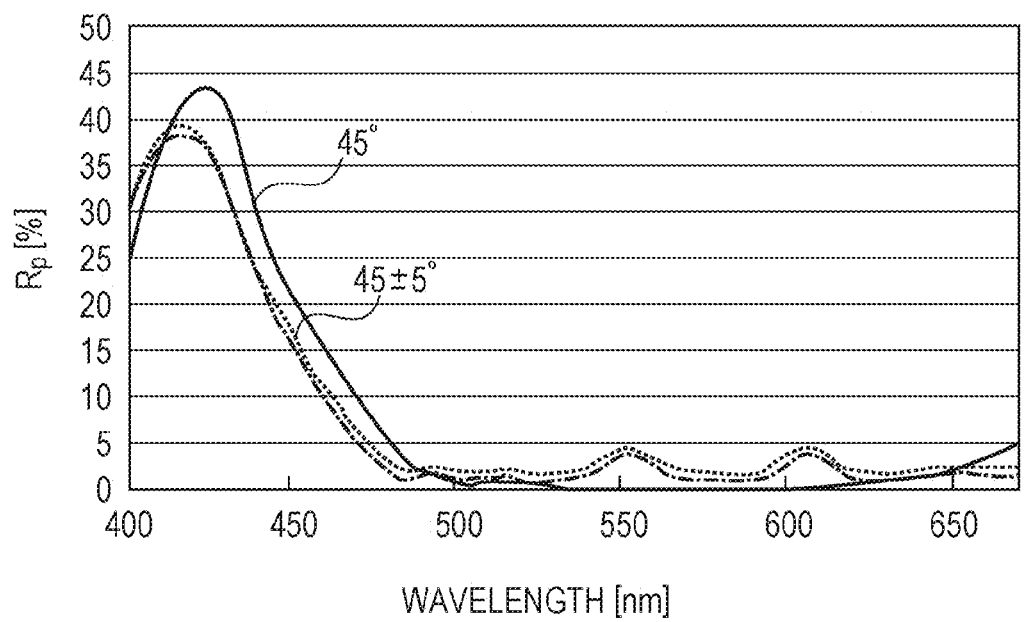
FIGS. 3A and 3B are each a graph illustrating the relationship between an incidence angle of light incident upon a polarization splitting film and a characteristic of the polarization splitting film.
Figure 3B:
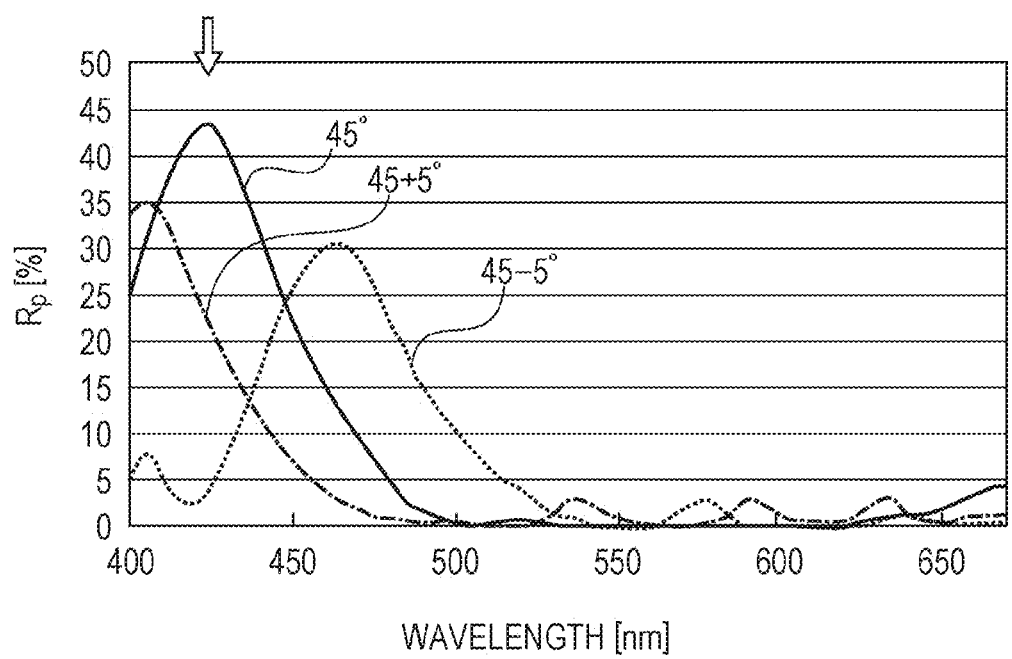

FIG. 3A is a graph illustrating changes in the characteristic of the polarization splitting film 8 with respect to changes in the incidence angle of light incident upon the polarization splitting film 8 in an XY-section (i.e., in the X-direction). FIG. 3B is a graph illustrating changes in the characteristic of the polarization splitting film 8 with respect to changes in the incidence angle of light incident upon the polarization splitting film 8 in a YZ-section (i.e., in the Y-direction). In each of the graphs of FIGS. 3A and 3B, the horizontal axis represents a wavelength (nm) and the vertical axis (Rp) represents reflectivity (%) of the P-polarized light. In FIGS. 3A and 3B, as the percentage of Rp becomes smaller, the value of an extinction ratio becomes higher and a more satisfactory characteristic of the polarization splitting film 8 is obtained. Further, in each of those graphs, a solid line represents the characteristic of the polarization splitting film 8 for a light beam incident upon the polarization splitting film 8 at the incidence angle of 45°. A broken line represents the characteristic of the polarization splitting film 8 for a light beam incident upon the polarization splitting film 8 at the incidence angle that is smaller than 45° by about 5°. A one-dot-chain line represents the characteristic of the polarization splitting film 8 for a light beam incident upon the polarization splitting film 8 at the incidence angle that is larger than 45° by about 5°. In addition, the polarization splitting film 8 having the characteristics illustrated in FIGS. 3A and 3B is designed so as to exhibit satisfactory performance in a band corresponding to a green wavelength range of 500 to 580 (nm) where the relative luminosity factor is maximum among the spectrum of the light source used in the image display apparatus.

As seen from FIGS. 3A and 3B, when the incidence angle of the light beam is changed in different directions by the same angle on the basis of the light beam that enters the polarization splitting film 8 at 45° with respect to a line normal to the polarization splitting film 8, the characteristic of the polarization splitting film 8 varies to a larger extent when the incidence angle is changed in the YZ-section than when the incidence angle is changed in the XY-section. In other words, the polarization splitting film 8 exhibits a better characteristic with respect to changes in the incidence angle in the XY-section (i.e., in the X-direction) than with respect to changes in the incidence angle in the YZ-section (i.e., in the Y-direction).

Figure 4:
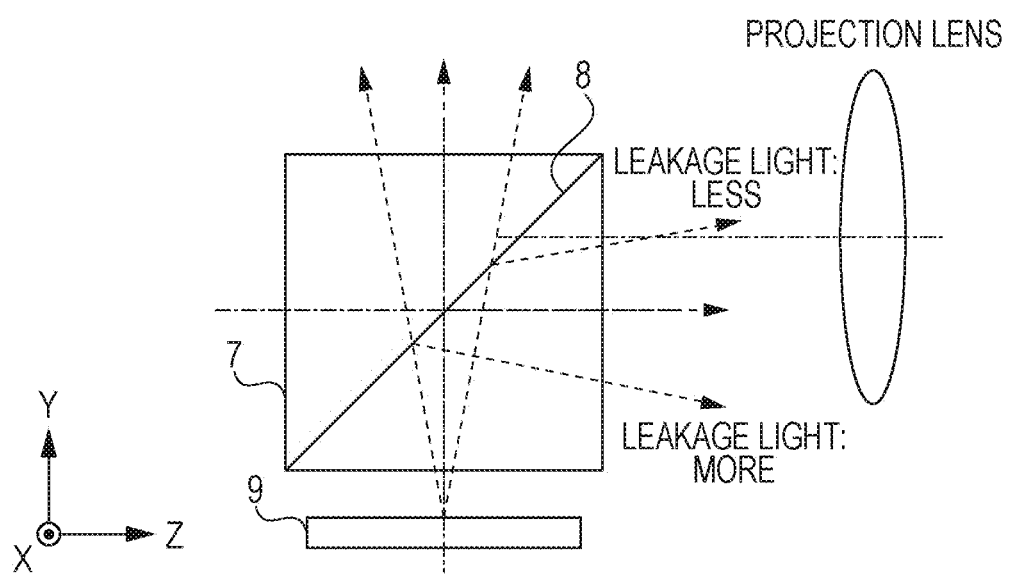
FIG. 4 is an illustration to explain leakage light from the polarizing beam splitter.

Let more closely look at the changes in the characteristic of the polarization splitting film 8 with respect to the changes in the incidence angle in the YZ-section, which are illustrated in FIG. 3B. Comparing the characteristics of the polarization splitting film 8 resulting when the incidence angle is changed by +5° and −5° in the YZ-section, it is seen that the changes in the characteristic of the polarization splitting film 8 behaves in a way differing from that in the case of FIG. 3A. The reason is that, on the basis of the thickness of the polarization splitting film 8 through which the light beam entering the polarization splitting film 8 at the incidence angle of 45° with respect to the line normal to the polarization splitting film 8 passes, the thickness of the polarization splitting film 8 through which the incident light beam passes is increased (namely, the optical path is lengthened) when the incidence angle of the light beam is changed by +5° in the Y-direction, and it is reduced (namely, the optical path is shortened) when the incidence angle of the light beam is changed by −5° in the Y-direction. Further, it is seen that the position (indicated by an arrow in FIG. 3B) of a peak of the characteristic curve in the graph shifts toward the shorter wavelength side when the incidence angle is 45+5° and toward the longer wavelength side when the incidence angle is 45−5°. As known in the art, a characteristic of an optical film generally shifts toward the longer wavelength side when a film thickness through which a light beam passes is shortened, and it shifts toward the shorter wavelength side when a film thickness through which a light beam passes is lengthened. Therefore, when light including a green wavelength range (500 to 580 nm) enters the polarization splitting film 8, the quantity of leakage light is less when the incidence angle is 45+α° than when the incidence angle is 45−α°. FIG. 4 illustrates, in a more easily understandable manner, how the quantity of leakage light changes (becomes less or more) depending on the incidence angle in the same section as that of FIG. 2. As illustrated in FIG. 4, the leakage of the light (P-polarized light) reflected at a certain point on the liquid crystal panel 9 and diverging to some extent is less in the +Y-direction and is more in the −Y-direction on the emergent surface side of the polarizing beam splitter 7.

Figure 5:
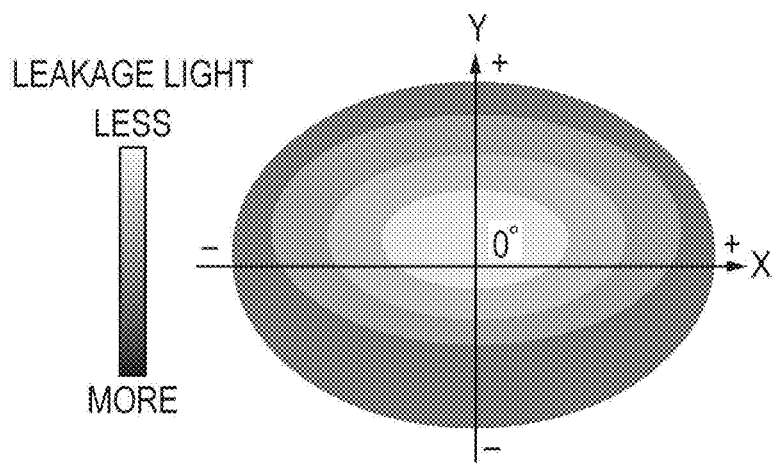
FIG. 5 illustrates an angular distribution of the leakage light from the polarization splitting film in the first embodiment.

FIG. 5 illustrates the incidence angle of the light beam entering the polarization splitting film 8 and a distribution of the leakage light in the XY-section when the liquid crystal panel 9 is driven in the mode where a projected image is displayed totally black. Each coordinate axis represents the incidence angle upon the polarization splitting film 8, and a deviation from an angle of 45° is 0° at the center (origin). The quantity of leakage light is less in a lighter black portion and is more in a denser black portion. The coordinate axes in FIG. 5 correspond to those in FIGS. 1 to 4, and the description of the coordinate axes is omitted. As seen from FIG. 5, though described above with reference to FIG. 3, the quantity of leakage light causing a reduction of the contrast is symmetric in the X-direction, but it is asymmetric in the Y-direction. In particular, the quantity of leakage light is more significantly increased in the −Y-direction. The angular distribution of the leakage light, illustrated in FIG. 5, can be confirmed by actually displaying a totally black image in the image display apparatus, and by observing the light from the image display element directly on the screen in a state where the projection lens is removed.

Figure 6:
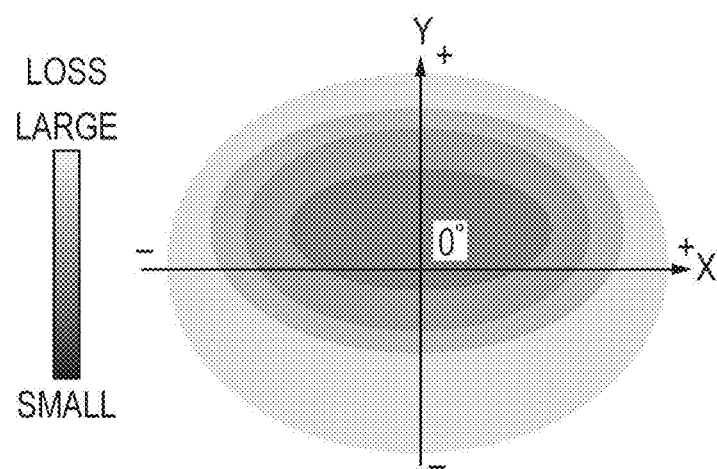
FIG. 6 illustrates a quantity of light that can be captured by a projection lens, and an angular distribution of the quantity of light captured.

An angular distribution of the light capable of being captured by the projection lens 10 will be described below. Let now look at a route along which the light advances to the projection lens 10 from the liquid crystal panel 9 while diverging and then reaches the screen 11 through the projection lens 10. A light beam reflected at and diverging from the center of the liquid crystal panel 9 in FIG. 1, i.e., from a point on the liquid crystal panel 9 corresponding to the center of the optical axis of the projection lens 10, is captured in all components within an angular range defined by the F-number of the projection lens 10. However, a light beam reflected at and diverging from a point on the liquid crystal panel 9, which is away from the point thereon corresponding to the center of the optical axis of the projection lens 10, is cut off in part of its components within a particular angular range due to vignetting by the projection lens 10. The term "vignetting" implies that, as an incident light beam is inclined at a larger angle with respect to the optical axis of the projection lens 10, the incident light beam becomes harder to pass through the entirety of a diaphragm due to the size and the thickness of the lens. In general, a projection lens of an image display apparatus (projector) is used in such a way that the direction of projection of the projection lens is set obliquely. In the configuration of FIG. 1, an image is projected in an obliquely upward direction. When an image is projected in such an oblique direction, an angular distribution of the light capable of being captured by the projection lens becomes also asymmetric in the Y-direction due to the vignetting. For reference, FIG. 6 illustrates a quantity of the light capable being captured by the projection lens, which is arranged as illustrated in FIG. 1, and an angular distribution of the light quantity when a light beam having a substantially uniform distribution in light quantity enters the projection lens. As seen from FIG. 6, the influence of the vignetting is less and a loss of the light quantity capable being captured by the projection lens is small in the +Y-direction. On the other hand, the light quantity capable being captured by the projection lens is reduced in the −Y-direction due to the influence of the vignetting.

In this embodiment, the projection lens 10 is arranged with respect to the image display element (liquid crystal panel) 9 as follows, taking into consideration the angular distribution of the leakage light, illustrated in FIG. 5, which is resulted based on the characteristic of the polarization splitting film 8. Assuming the optical path L of the light beam that emerges from the center of the liquid crystal panel 9 and reaches the point where the optical axis of the projection lens 10 intersects the optical surface within the projection lens 10, which is closest to the illumination optical system, the projection lens 10 is arranged such that the angle θ formed by the optical path L and the polarization splitting film 8 of the polarizing beam splitter 7 is smaller than 45°. Stated another way, the projection lens 10 and the mounting slot (mounting portion) for the projection lens 10 are arranged such that the incidence angle and the emergence angle of the light beam propagating along the optical path L with respect to the normal to the polarization splitting film 8 is larger than 45°.

Thus, according to the first embodiment, since the optical axis of the projection lens (i.e., the axis of the projection lens passing the center of the mounting slot) is shifted to the side where the quantity of leakage light is less, the leakage light generated at the polarization splitting film can be effectively cut off by utilizing the influence of the vignetting that is caused within the projection lens. In other words, the optical axis of the projection lens 10 is aligned with a point where the quantity of leakage light from the polarization splitting film 8 is at its minimum. As a result, the quantity of leakage light included in the projected image is reduced and the contrast of the projected image is improved.

Second Embodiment

FIGS. 7A and 7B illustrate an image display apparatus according to a second embodiment of the present invention. The second embodiment differs from the first embodiment in that an illumination optical system in the second embodiment has the function of compressing a light beam in each of a first section (XZ-section) and a second section (YZ-section), each of which includes an optical axis of the illumination optical system and which are orthogonal to each other. FIG. 7A is a sectional view, taken along the XZ-section, of the image display apparatus according to the second embodiment, and FIG. 7B is a sectional view, taken along the YZ-section, of the image display apparatus according to the second embodiment.

In FIGS. 7A and 7B, reference numeral 1 denotes a light source. A reflector 2 reflects light emitted from the light source 1 in a predetermined direction. Reference numeral 12 denotes a convex lens (positive lens). Reference numeral 13 denotes a concave cylindrical lens (specifically, a lens having negative refractive power in the X-direction and having no refractive power in the Y-direction), and 14 denotes a concave cylindrical lens (specifically, a lens having no refractive power in the X-direction and having negative refractive power in the Y-direction). In other words, reference numeral 13 denotes a first negative cylindrical lens, and 14 denotes a second negative cylindrical lens. A first fly-eye lens 3a is made up of rectangular lens elements which are each similar in shape to a panel and which are arranged in a matrix pattern. A second fly-eye lens 3b includes lens elements that correspond respectively to the individual rectangular lens elements of the first fly-eye lens 3a. A polarization conversion element 4 has the function of converting unpolarized light from the light source 1 to linearly-polarized light. Reference numerals 5a and 5b each denote a condenser lens, and 6 denotes a reflecting mirror. Reference numeral 7 denotes a polarizing beam splitter, 8 denotes a polarization splitting film, and 9 denotes a reflective liquid crystal panel (image display element). Reference numeral 10 denotes a projection lens (projection optical system), and 11 denotes a screen (projection plane). The condenser lenses 5a and 5b may be a single convex lens. In this second embodiment, a high-pressure mercury lamp is used as the light source 1, and a parabolic mirror is used as the reflector 2. As in the first embodiment, a mounting slot for mounting the projection lens 10 is formed in a main body of the image display apparatus, and the projection lens 10 is mounted into the mounting slot.

The light emitted from the light source 1 is collected by the reflector 2 and enters the convex lens 12. The light is converged by the convex lens 12 and enters the concave cylindrical lens 13. Through the convex lens 12 and the concave cylindrical lens (negative cylindrical lens) 13, the light becomes substantially parallel light in the X-direction in the XZ-section of FIG. 7A. The light having entered the first fly-eye lens 3a is separated into a plurality of light beams by individual lens elements forming the first fly-eye lens 3a. The plural divided light beams having passed through the first fly-eye lens 3a enter the concave cylindrical lens 14 and exit it as substantially parallel light beams in the YZ-section of FIG. 7B by the cooperated action of the convex lens 12 and the concave cylindrical lens 14 positioned at the front of the second fly-eye lens 3b. The light beams compressed in each of the XZ-section and the YZ-section pass through the second fly-eye lens 3b and enter the polarization conversion element 4. P-polarized light converted from the incident light upon the polarization conversion element 4 is converged by the condenser lenses 5a and 5b and is reflected by the reflecting mirror 6 to enter the polarizing beam splitter 7. The light having entered the polarizing beam splitter 7 passes through the polarization splitting film 8 for illumination of the liquid crystal panel 9. In a mode where pixels are displayed white, the liquid crystal panel 9 modulates the P-polarized light into S-polarized light. The light modulated by the liquid crystal panel 9 is reflected by the polarization splitting film 8 of the polarizing beam splitter 7 and is projected onto the screen 11 through the projection lens 10. In the mode where the pixels are displayed black, the liquid crystal panel 9 reflects the P-polarized light without converting the polarization direction thereof. The light reflected by the liquid crystal panel 9 returns toward the light source side after passing through the polarization splitting film 8. Also in the illumination optical system of the second embodiment, Koehler illumination is performed for the liquid crystal panel 9 by arranging the light source 1 and the second fly-eye lens 3b in conjugate positions and by arranging the first fly-eye lens 3a and the liquid crystal panel 9 in conjugate positions.

Figure 8:
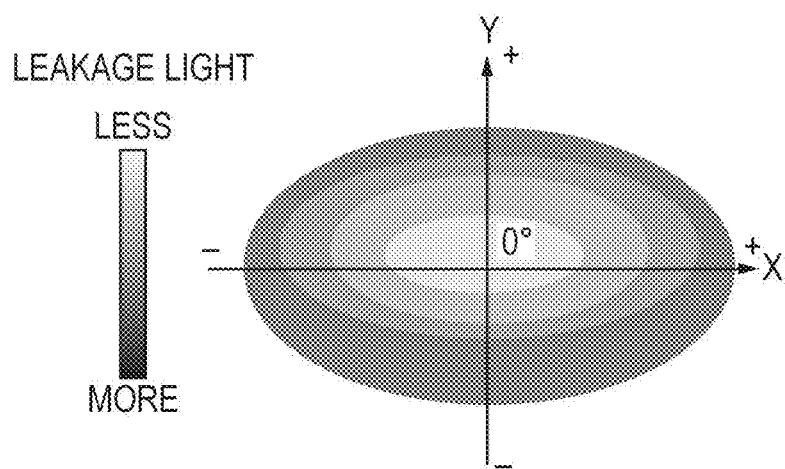
FIG. 8 illustrates an angular distribution of the leakage light from the polarization splitting film in the second embodiment.

In the second embodiment, as in the first embodiment, the characteristic of the polarization splitting film 8 varies and leakage light causing a reduction of the contrast is generated depending on changes in the angle at which the light beam reflected by the liquid crystal panel 9 enters the polarization splitting film 8 of the polarizing beam splitter 7. FIG. 8 illustrates an angular distribution of the leakage light at the polarization splitting film 8 when the light beam is modulated by the liquid crystal panel into the polarization state corresponding to a totally black image. Each coordinate axis in FIG. 8 represents the incidence angle upon the polarization splitting film 8, and a deviation from an angle of 45° is 0° at the center (origin). The quantity of leakage light is less in a lighter black portion and is more in a denser black portion. The coordinate axes in FIG. 8 correspond to those in FIG. 7, and the description of the coordinate axes is omitted. In the second embodiment, the light beam is compressed in both the X-direction and the Y-direction independently, and a compression rate of the light beam in the Y-axis direction is higher than that in the first embodiment.

Further, as in the first embodiment, assuming an optical path L of the light beam that emerges from the center of the liquid crystal panel 9 and reaches the point where the optical axis of the projection lens 10 intersects the optical surface within the projection lens 10, which is closest to the illumination optical system, an angle θ formed by the optical path L and a film boundary line of the polarization splitting film 8 in the YZ-plane is set to be smaller than 45° (namely, the incidence angle and the emergence angle of the light beam propagating along the optical path L with respect to the polarization splitting film 8 is set to be larger than 45'). Accordingly, the leakage light generated in the −Y-direction can be effectively cut off by utilizing the influence of the vignetting that is caused within the projection lens. As a result, the contrast of the projected image can be improved without inserting, e.g., a polarizer to cut off the leakage light.

As additional advantageous effect of the second embodiment, since the compression rate of the light beam is set different between the X-direction and the Y-direction such that the light beam is more strongly compressed in the Y-direction, spreading of the incidence angle upon the polarization splitting film 8 can be reduced in the Y-direction in which the characteristic of the polarization splitting film 8 varies to a larger extent. As a result, the quantity of leakage light can be reduced in the second embodiment in comparison with the case of compressing the light beam in the X-direction and the Y-direction at the same rate. The term "compression" used in this specification implies an optical action of making the width of a light beam after exiting an optical system, which is substantially afocal, smaller than that of the light beam before entering the optical system, and the term "compression" rate implies a rate of the compression.

Third Embodiment

Figure 9:
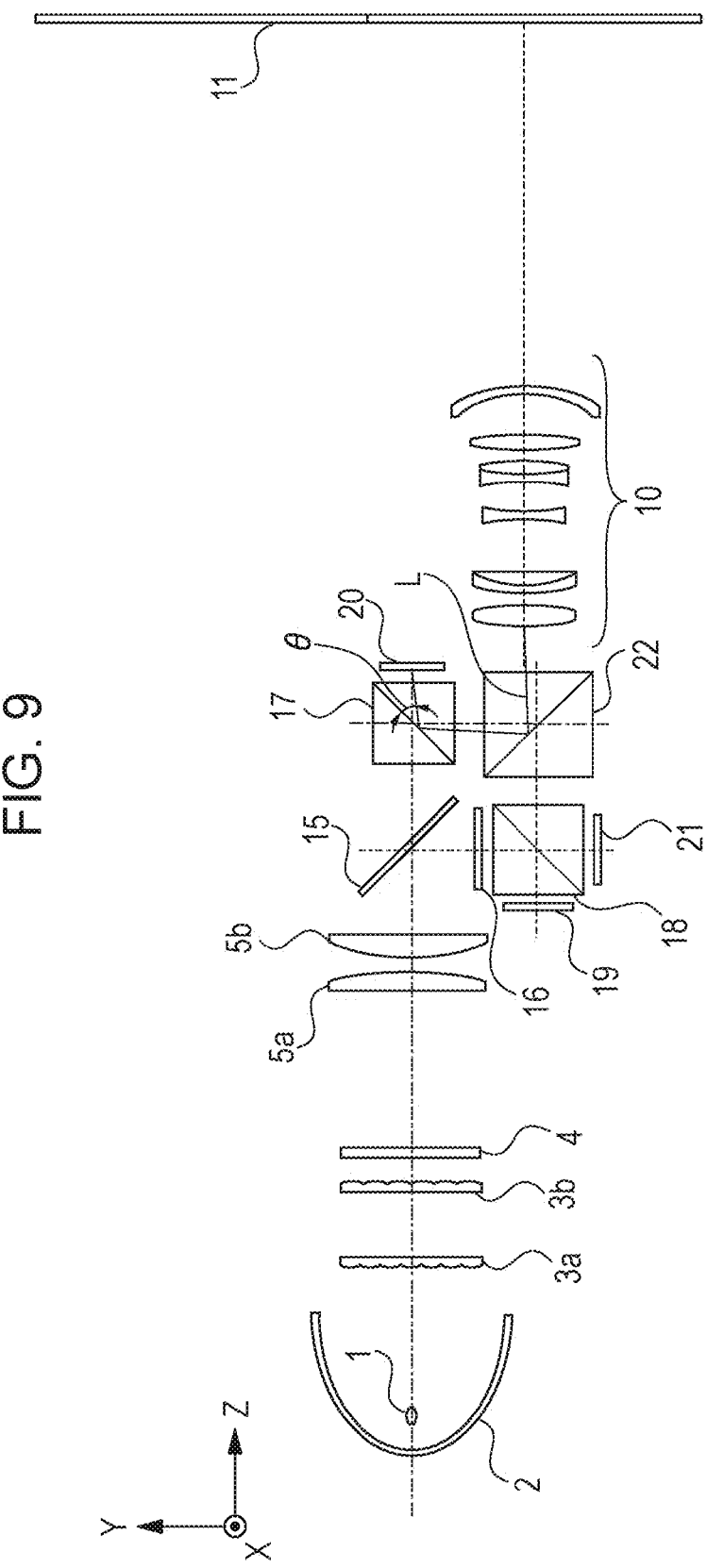
FIG. 9 illustrates an image display apparatus according to a third embodiment of the present invention.

FIG. 9 illustrates an image display apparatus according to a third embodiment of the present invention. The following description is made about only different points from the configuration of FIG. 1. The polarization conversion element 4 converts the incident light to P-polarized light. Reference numeral 15 denotes a dichroic mirror (color separation element), and 16 denotes a wavelength selective phase plate that acts upon only light in a red wavelength band to rotate the polarization direction of the light through 90°. Reference numerals 17 and 18 denote a first polarizing beam splitter and a second polarizing beam splitter, respectively. Reference numeral 19 denotes a reflective liquid crystal panel for red (first image display element), 20 denotes a reflective liquid crystal panel for green (second image display element), and 21 denotes a reflective liquid crystal panel for blue (third image display element). A combining prism (combining element) 22 reflects light in a green wavelength band and transmits light in red and blue wavelength bands therethrough. A one-dot-chain line in FIG. 9 represents the optical axis of the condenser lens 5a or the optical axis of the projection lens 10, or both. The dichroic mirror 15 and the first and second polarizing beam splitters 17 and 18 are arranged such that a plane including a color separation surface of the dichroic mirror 15 perpendicularly intersects a plane including polarized-light separation surfaces of the first and second polarizing beam splitters 17 and 18.

The light beam having exited the condenser lens 5b enters the dichroic mirror 15. Of the incident light beam, the dichroic mirror 15 transmits only light in the green wavelength band (first-color light) therethrough, and reflects light in the blue and red wavelength bands (second-color light and third-color light). The light in the green wavelength band passes through the polarizing beam splitter (first polarizing beam splitter) for illumination of the liquid crystal panel 20 for green. S-polarized light converted from the incident light by the liquid crystal panel 20 for green is reflected by the polarizing beam splitter 17 and is further reflected by the combining prism 22 to be projected onto the projection plane (screen) 11 through the projection lens 10. Light having not been converted in the polarization direction by the liquid crystal panel 20 passes through the polarizing beam splitter 17 again for return to the light source side.

The light in the red and blue wavelength bands, which has been reflected by the dichroic mirror 15, passes through the wavelength selective phase plate 16. The wavelength selective phase plate 16 acts upon only the red-band light to rotate the polarization direction thereof through 90° for conversion to S-polarized light. The red-band light having been converted to the S-polarized light is reflected by a polarization splitting film of the polarizing beam splitter 18 (second polarizing beam splitter) and enters the liquid crystal panel 19 for red. The red-band light having been converted to P-polarized light by the liquid crystal panel 19 passes through both the polarizing beam splitter 18 and the combining prism 22 to be projected onto the projection plane (screen) 11 through the projection lens 10. S-polarized red-band light having been not converted by the liquid crystal panel 19 is reflected by the polarization splitting film of the polarizing beam splitter 18 for return to the light source side.

The blue-band light having been reflected by the dichroic mirror 15 passes through the wavelength selective phase plate 16 and further passes through the polarizing beam splitter 18 to enter the liquid crystal panel 21 for blue. The blue-band light having been converted from P-polarized light to S-polarized light upon entering the liquid crystal panel 21 for blue is reflected by the polarizing beam splitter 18 and passes through the combining prism 22 to be projected onto the projection plane (screen) 11 through the projection lens 10. The P-polarized blue-band light having been not converted by the liquid crystal panel 21 passes through the polarizing beam splitter 18 for return to the light source side.

As described above in the first embodiment, the characteristic of the polarization splitting film varies and leakage light causing a reduction of the contrast is generated depending on changes in the angle at which the light beam reflected by the liquid crystal panel 20 enters the polarization splitting film of the polarizing beam splitter 17.

Looking here at the leakage light in the green wavelength band, which most contributes to brightness of a projected image, as in the first embodiment, the extinction ratio of the P-polarized light is reduced with respect to changes in the incidence angle corresponding to a reduction of the thickness of the polarization splitting film 8 through which the light beam passes. Assuming an optical path L of the light beam that emerges from the center of the liquid crystal panel 20 and reaches the point where the optical axis of the projection lens 10 intersects the optical surface within the projection lens 10, which is closest to the illumination optical system, an angle θ formed by the optical path L and a film boundary line of the polarization splitting film of the polarizing beam splitter 17 in the YZ-section is set to be smaller than 45° (namely, the incidence angle and the emergence angle of the light beam propagating along the optical path L with respect to the polarization splitting film is set to be larger than 45'). Accordingly, the leakage light generated in the −Y-direction can be effectively cut off by utilizing the influence of the vignetting that is caused within the projection lens. As a result, the leakage light can be suppressed without arranging a polarizer, which has low transmittance, on the emergent side of the polarizing beam splitter. Thus, the contrast of the projected image can be improved while minimizing a reduction of brightness of the projected image.

Further, in the third embodiment, the projection lens 10 and the mounting slot for the projection lens 10 are arranged such that, in the direction in which the polarizing beam splitter 17 and the combining element 22 are aligned (i.e., in the Y-direction), the optical axis of the projection lens 10 is shifted parallel toward the polarizing beam splitter 17 relative to an emergent path of the light beam from the combining element (prism) 22, which has propagated along an optical path aligned with the optical axis of the illumination optical system, (i.e., relative to a path of the incident light upon the projection lens 10).

With such an arrangement, the size of the image display (projection) apparatus can be reduced in the direction in which the optical axis of the projection lens (i.e., an axis passing the center of the mounting slot for the projection lens 10) is shifted (namely, in the Y-direction in FIG. 9). The reason is that the optical axis of the projection lens 10 is arranged between the combining prism 22 and the polarizing beam splitter 17, i.e., at a more inner position within a housing.

Fourth Embodiment

Figure 10:
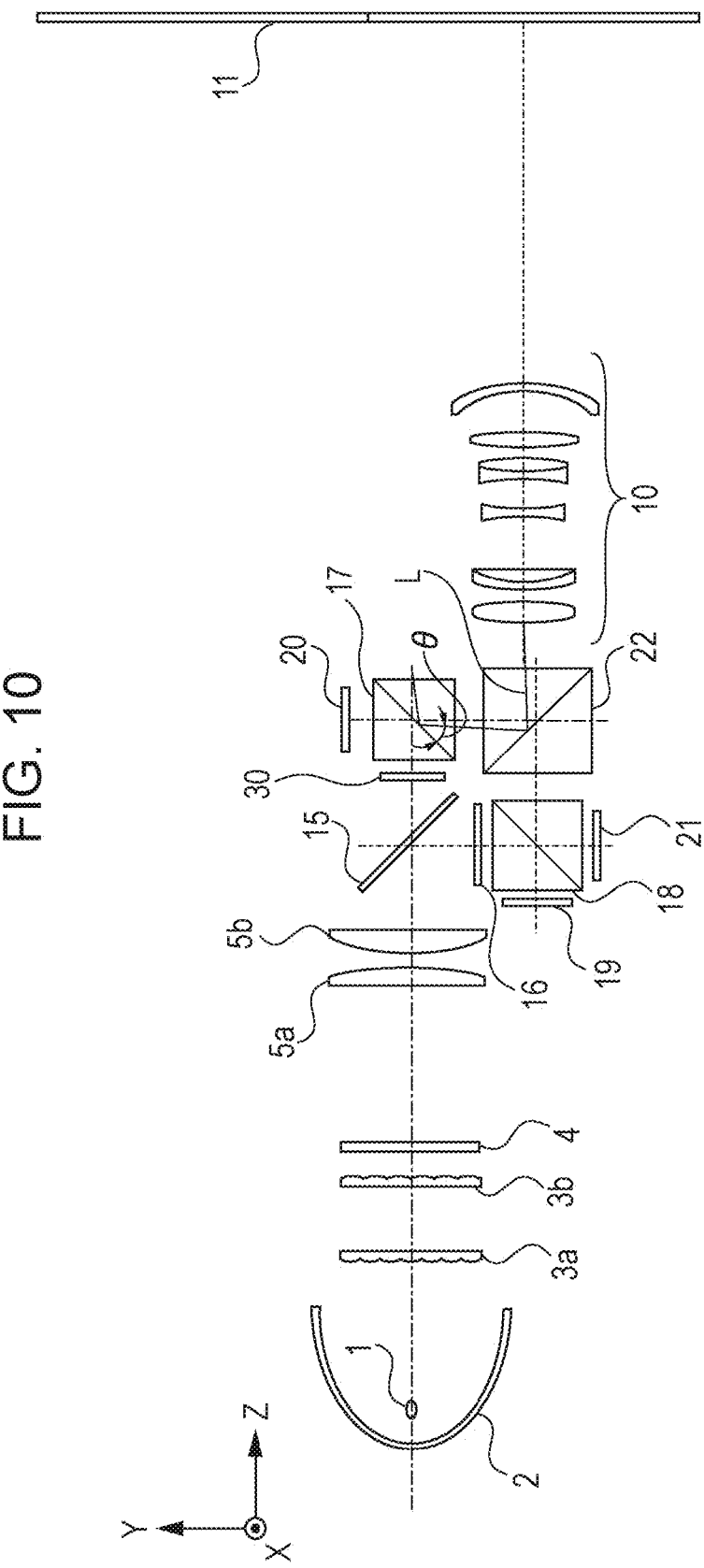
FIG. 10 illustrates an image display apparatus according to a fourth embodiment of the present invention.

FIG. 10 illustrates an image display apparatus according to a fourth embodiment of the present invention. The image display apparatus according to the fourth embodiment differs from that according to the third embodiment, illustrated in FIG. 9, in the arrangement of the liquid crystal panel 20 for green with respect to the polarizing beam splitter 17 (first polarizing beam splitter). Corresponding to such a modification in the arrangement of the liquid crystal panel 20, a half-wavelength plate 30 is disposed between the dichroic mirror 15 and the polarizing beam splitter 17. Because the remaining configuration is the same as that in the third embodiment, the following description is made only about different points from the configuration of the third embodiment.

In this fourth embodiment, the liquid crystal panel 20 is arranged such that the liquid crystal panel 20 is illuminated with the light reflected from the polarizing beam splitter 17. Because the green-band illumination light having passed through the dichroic mirror 15 is converted to the P-polarized light by the polarization conversion element 4, it is not reflected by the polarizing beam splitter 17 if it remains as the P-polarized light. In this fourth embodiment, therefore, the half-wavelength plate 30 is disposed between the dichroic mirror 15 and the polarizing beam splitter 17 for converting the polarization direction of the illumination light to the S-polarization.

With that arrangement, the green-band illumination light having been substantially converted to the S-polarized light is selectively reflected by the polarizing beam splitter 17 for illumination of the liquid crystal panel 20. P-polarized light obtained with the conversion by the liquid crystal panel 20 passes through the polarizing beam splitter 17 and is reflected by the combining prism 22 to be projected onto the projection plane (screen) 11 through the projection lens 10. The light having been not converted in the polarization direction thereof by the liquid crystal panel 20 is reflected by the polarizing beam splitter 17 again for return to the light source side.

Also in the fourth embodiment, an angle θ formed by the optical path L and the polarization splitting film of the polarizing beam splitter 17 in the YZ-section is set to be smaller than 45° (namely, the incidence angle and the emergence angle of the light beam propagating along the optical path L with respect to the polarization splitting film is set to be larger than 45'). Hence, a proportion of the leakage light generated at the polarizing beam splitter 17 and entering the projection lens 10 is reduced, whereby the contrast of the projected image can be improved.

Further, in the fourth embodiment, since the liquid crystal panel 20, associated circuits, etc. are not present in a space toward which the projection lens 10 is shifted, the degree of freedom in layout of the projection lens 10 is increased. For example, the size of the image display (projection) apparatus can be reduced by effectively utilizing the space where the liquid crystal panel 20 is positioned in FIG. 9, for shifting of the projection lens 10.

The arrangement capable of providing the advantage of the fourth embodiment is not limited to that illustrated in FIG. 10. For example, in such a modified arrangement that the half-wavelength plate 30 is omitted and the S-polarized light is guided to enter the polarizing beam splitter 17, the liquid crystal panel 20 is similarly not required to be arranged at the position toward which the projection lens is shifted.

While the preferred embodiments of the present invention have been described above, the present invention is not limited to those embodiments and can be variously modified and changed within the scope of the invention. For example, the light source may be a laser beam source emitting linearly-polarized light. Also, the characteristic of the dichroic mirror 15 and the characteristic of the combining prism 22 may be changed respectively to transmit the red-band light therethrough and to transmit the blue-band light and the green-band light therethrough. Further, the present invention can be applied to an image display apparatus in which a cross-dichroic prism is employed and three polarizing beam splitters are arranged corresponding to liquid crystal panels for three colors, respectively.

According to each of the first to fourth embodiments, the image display apparatus ensuring high contrast of the projected image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-290099 filed Dec. 22, 2009, which is hereby incorporated by reference herein in its entirety.

What is claimed is:

1. An image display apparatus comprising:
   an image display element configured to display an image by controlling a polarization state of a polarized light beam;
   an illumination optical system configured to guide the polarized light beam towards the image display element;
   a polarizing beam splitter including a polarization splitting film, which is disposed between the illumination optical system and the image display element and which selectively splits incident light by reflecting S-polarized light and transmitting P-polarized light therethrough; and
   a mounting portion to which is mounted a projection optical system configured to project the image displayed by the image display element onto a projection plane,
   wherein the mounting portion of the projection optical system is arranged in a section parallel to both a line normal to the polarization splitting film and a line normal to the image display element such that an angle, which is formed by the polarization splitting film and an optical path of a light beam emerging from a center of the image display element and reaching a point where an optical axis of the projection optical system intersects an optical surface of the projection optical system closest to the image display element, is smaller than 45°,
   wherein the optical path of the light beam emerging from the center of the image display element and reaching the point where the optical axis of the projection optical system intersects the optical surface of the projection optical system closest to the image display element does not overlap an optical path of a light beam passing on the optical axis of the illumination optical system and entering the image display element on the section parallel to the line normal to the polarization splitting film and the line normal to the image display element.

2. The image display apparatus according to claim 1, wherein a refractive index of the polarizing beam splitter is n, where n is at least 1.6.

3. The image display apparatus according to claim 1, wherein the illumination optical system includes a positive lens, a first negative cylindrical lens, and a second negative cylindrical lens, which are arranged in successive order from a light source side toward the projection plane of the image display apparatus, and
   the positive lens and the first negative cylindrical lens compress the light beam in a first section, and the positive lens and the second negative cylindrical lens compress the light beam in a second section, which comprises an optical axis of the illumination optical system and which is perpendicular to the first section, the light beam being compressed at different compression rates in the first section and the second section.

4. An image display apparatus comprising:
   first, second and third image display elements each configured to display an image by controlling a polarization state of a polarized light beam;
   an illumination optical system configured to introduce the polarized light beam to each of the first, second and third image display elements;
   a color separation element configured to separate the light beam emerging from the illumination optical system into a first-color light and a second-color light and a third-color light;
   a first polarizing beam splitter including a polarization splitting film, which is disposed between the color separation element and the first image display element and which selectively splits incident light by reflecting S-polarized light and transmitting P-polarized light therethrough;

a second polarizing beam splitter including a polarization splitting film, which is disposed between the color separation element and the second and third image display elements and which selectively splits incident light by reflecting S-polarized light and transmitting P-polarized light therethrough;

a combining element configured to combine the light beams reflected by the first, second and third image display elements; and a mounting portion to which is mounted a projection optical system configured to project the light combined by the combining element onto a projection plane, wherein the mounting portion of the projection optical system is arranged in a section parallel to both a line normal to the polarization splitting film of the first polarizing beam splitter and a line normal to the first image display element such that an angle, which is formed by the polarization splitting film of the first polarizing beam splitter and an optical path of a light beam emerging from a center of the first image display element and reaching a point where an optical axis of the projection optical system intersects an optical surface of the projection optical system closest to the first image display element, is smaller than 45°, and wherein the optical path of the light beam emerging from the center of the first image display element and reaching the point where the optical axis of the projection optical system intersects the optical surface of the projection optical system closest to the first image display element does not overlap an optical path of a light beam passing on the optical axis of the illumination optical system and entering the image display element on the section parallel to the line normal to the first polarization splitting film and the line normal to the first image display element.

5. The image display apparatus according to claim 4, wherein the first-color light is light in a green wavelength band.

6. An image display apparatus comprising:
an image display element configured to display an image by controlling a polarization state of a polarized light beam;
an illumination optical system configured to introduce the polarized light beam to the image display element;
a polarizing beam splitter including a polarization splitting film, which is disposed between the illumination optical system and the image display element and which selectively splits incident light by reflecting S-polarized light and transmitting P-polarized light therethrough; and
a projection optical system configured to project the image displayed by the image display element onto a projection plane,
wherein the projection optical system is arranged such that, in a section parallel to both a line normal to the polarization splitting film and a line normal to the image display element, an angle formed by the polarization splitting film and an optical path of a light beam emerging from a center of the image display element and reaching a point where an optical axis of the projection optical system intersects an optical surface within the projection optical system, which is closest to the image display element, is smaller than 45°.

7. An image display apparatus comprising:
first, second and third image display elements each configured to display an image by controlling a polarization state of a polarized light beam;
an illumination optical system configured to introduce the polarized light beam to each of the first, second and third image display elements;
a color separation element configured to separate the light beam emerging from the illumination optical system into first-color light and second- and third-color light;
a first polarizing beam splitter including a polarization splitting film, which is disposed between the color separation element and the first image display element and which selectively splits incident light by reflecting S-polarized light and transmitting P- polarized light therethrough;
a second polarizing beam splitter including a polarization splitting film, which is disposed between the color separation element and the second and third image display elements and which selectively splits incident light by reflecting S-polarized light and transmitting P-polarized light therethrough;
a combining element configured to combine the light beams reflected by the first, second and third image display elements together; and
a projection optical system configured to project the light combined by the combining element onto a projection plane,
wherein the projection optical system is arranged such that, in a section parallel to both a line normal to the polarization splitting film of the first polarizing beam splitter and a line normal to the first image display element, an angle formed by the polarization splitting film of the first polarizing beam splitter and an optical path of a light beam emerging from a center of the first image display element and reaching a point where an optical axis of the projection optical system intersects an optical surface within the projection optical system, which is closest to the first image display element, is smaller than 45°,
wherein the optical path of the light beam emerging from the center of the image display element and reaching the point where the optical axis of the projection optical system intersects the optical surface of the projection optical system closest to the image display element does not overlap an optical path of a light beam passing on the optical axis of the illumination optical system and entering the image display element on the section parallel to the line normal to the polarization splitting film and the line normal to the image display element.

8. An image display apparatus comprising:
an image display element configured to display an image by controlling a polarization state of a polarized light beam;
an illumination optical system configured to introduce the polarized light beam to the image display element;
a polarizing beam splitter including a polarization splitting film, which is disposed between the illumination optical system and the image display element and which selectively splits incident light by reflecting S-polarized light and transmitting P- polarized light therethrough; and
a mounting portion to which is mounted a projection optical system configured to project the image displayed by the image display element onto a projection plane,
wherein the mounting portion is arranged such that, in a section parallel to both a line normal to the polarization splitting film and a line normal to the image display element, an emergence angle of a light beam from the polarization splitting film is larger than 45°, the light beam emerging from a center of the image display element and reaching a point where an optical axis of the projection optical system intersects an optical surface within the projection optical system, which is closest to the image display element, and wherein the optical path of the light beam emerging from the center of the first image display element and reaching the point where the optical axis of the projection optical system intersects the optical surface of the projection optical system closest to the first image display element does not overlap an optical path of a light beam passing on the optical axis of the illumination optical system and entering the image display element on the section parallel to the line normal to the first polarization splitting film and the line normal to the first image display element.

9. An image display apparatus comprising:

first, second and third image display elements each configured to display an image by controlling a polarization state of a polarized light beam;

an illumination optical system configured to introduce the polarized light beam to each of the first, second and third image display elements;

a color separation element configured to separate the light beam emerging from the illumination optical system into first-color light and second- and third-color light;

a first polarizing beam splitter including a polarization splitting film, which is disposed between the color separation element and the first image display element and which selectively splits incident light by reflecting S-polarized light and transmitting P-polarized light therethrough;

a second polarizing beam splitter including a polarization splitting film, which is disposed between the color separation element and the second and third image display elements and which selectively splits incident light by reflecting S-polarized light and transmitting P-polarized light therethrough;

a combining element configured to combine the light beams reflected by the first, second and third image display elements together; and a mounting portion to which is mounted a projection optical system configured to project the light combined by the combining element onto a projection plane, wherein the mounting portion is arranged such that, in a section parallel to both a line normal to the polarization splitting film of the first polarizing beam splitter and a line normal to the first image display element, an emergence angle of a light beam from the polarization splitting film of the first polarization beam splitter is larger than 45°, the light beam emerging from a center of the first image display element and reaching a point where an optical axis of the projection optical system intersects an optical surface within the projection optical system, which is closest to the first image display element, and wherein the optical path of the light beam emerging from the center of the image display element and reaching the point where the optical axis of the projection optical system intersects the optical surface of the projection optical system closest to the image display element does not overlap an optical path of a light beam passing on the optical axis of the illumination optical system and entering the image display element on the section parallel to the line normal to the polarization splitting film and the line normal to the image display element.

10. An image display apparatus comprising:

an image display element configured to display an image by controlling a polarization state of a polarized light beam;

an illumination optical system configured to introduce the polarized light beam to the image display element;

a polarizing beam splitter including a polarization splitting film, which is disposed between the illumination optical system and the image display element and which selectively splits incident light by reflecting S-polarized light and transmitting P-polarized light therethrough; and a projection optical system configured to project the image displayed by the image display element onto a projection plane, wherein the projection optical system is arranged such that, in a section parallel to both a line normal to the polarization splitting film and a line normal to the image display element, an emergence angle of a light beam from the polarization splitting film is larger than 45°, the light beam emerging from a center of the image display element and reaching a point where an optical axis of the projection optical system intersects an optical surface within the projection optical system, which is closest to the image display element, and wherein the optical path of the light beam emerging from the center of the first image display element and reaching the point where the optical axis of the projection optical system intersects the optical surface of the projection optical system closest to the first image display element does not overlap an optical path of a light beam passing on the optical axis of the illumination optical system and entering the image display element on the section parallel to the line normal to the first polarization splitting film and the line normal to the first image display element.

11. An image display apparatus comprising:

first, second and third image display elements each configured to display an image by controlling a polarization state of a polarized light beam;

an illumination optical system configured to introduce the polarized light beam to each of the first, second and third image display elements;

a color separation element configured to separate the light beam emerging from the illumination optical system into first-color light and second- and third-color light;

a first polarizing beam splitter including a polarization splitting film, which is disposed between the color separation element and the first image display element and which selectively splits incident light by reflecting S-polarized light and transmitting P-polarized light therethrough;

a second polarizing beam splitter including a polarization splitting film, which is disposed between the color separation element and the second and third image display elements and which selectively splits incident light by reflecting S-polarized light and transmitting P-polarized light therethrough;

a combining element configured to combine the light beams reflected by the first, second and third image display elements together; and a projection optical system configured to project the light combined by the combining element onto a projection plane, wherein the projection optical system is arranged such that, in a section parallel to both a line normal to the polarization splitting film of the first polarizing beam splitter and a line normal to the first image display element, an emergence angle of a light beam from the polarization splitting film of the first polarizing beam splitter is larger than 45°, the light beam emerging from a center of the image display element and reaching a point where an optical axis of the projection optical system intersects an optical surface within the projection optical system, which is closest to the first image display element, wherein the optical path of the light beam emerging from the center of the image display element and reaching the point where the optical axis of the projection optical system intersects the optical surface of the projection optical system closest to the image display element does not overlap an optical path of a light beam passing on the optical axis of the illumination optical system and entering the image display element on the section parallel to the line normal to the polarization splitting film and the line normal to the image display element.

12. An image display apparatus comprising:

first, second and third image display elements each configured to display an image by controlling a polarization state of a polarized light beam;

an illumination optical system configured to introduce the polarized light beam to each of the first, second and third image display elements;

a color separation element configured to separate the light beam emerging from the illumination optical system into first-color light and second- and third-color light;

a first polarizing beam splitter including a polarization splitting film, which is disposed between the color separation element and the first image display element and which selectively splits incident light by reflecting S-polarized light and transmitting P- polarized light therethrough;

a second polarizing beam splitter including a polarization splitting film, which is disposed between the color separation element and the second and third image display elements and which selectively splits incident light by reflecting S-polarized light and transmitting P-polarized light therethrough;

a combining element configured to combine the light beams reflected by the first, second and third image display elements together; and a mounting portion to which is mounted a projection optical system configured to project the light combined by the combining element onto a projection plane, the color separation element and the first and second polarizing beam splitters being arranged such that a plane including a color separation surface of the color separation element and planes including polarization splitting surfaces of the first and second polarizing beam splitters are orthogonal to each other, wherein the mounting portion is arranged such that, in a direction in which the first polarizing beam splitter and the combining element are aligned, an optical axis of the projection optical system is closer to the first polarizing beam splitter than an optical path positioned on an emergent side of the combining element of a light beam which propagates along an optical path aligned with an optical axis of the illumination optical system and which emerges from the combining element, wherein the optical path of the light beam emerging from the center of the first image display element and reaching the point where the optical axis of the projection optical system intersects the optical surface of the projection optical system closest to the first image display element does not overlap an optical path of a light beam passing on the optical axis of the illumination optical system and entering the image display element on the section parallel to the line normal to the first polarization splitting film and the line normal to the first image display element.

13. An image display apparatus comprising:

first, second and third image display elements each configured to display an image by controlling a polarization state of a polarized light beam;

an illumination optical system configured to introduce the polarized light beam to each of the first, second and third image display elements;

a color separation element configured to separate the light beam emerging from the illumination optical system into first-color light and second- and third-color light;

a first polarizing beam splitter including a polarization splitting film, which is disposed between the color separation element and the first image display element and which selectively splits incident light by reflecting S-polarized light and transmitting P-polarized light therethrough;

a second polarizing beam splitter including a polarization splitting film, which is disposed between the color separation element and the second and third image display elements and which selectively splits incident light by reflecting S-polarized light and transmitting P-polarized light therethrough;

a combining element configured to combine the light beams reflected by the first, second and third image display elements together; and a projection optical system configured to project the light combined by the combining element onto a projection plane, the color separation element and the first and second polarizing beam splitters being arranged such that a plane including a color separation surface of the color separation element and planes including polarization splitting surfaces of the first and second polarizing beam splitters are orthogonal to each other, wherein the projection optical system is arranged such that, in a direction in which the first polarizing beam splitter and the combining element are aligned, an optical axis of the projection optical system is closer to the first polarizing beam splitter than an optical path positioned on an emergent side of the combining element of a light beam which propagates along an optical path aligned with an optical axis of the illumination optical system and which emerges from the combining element.

14. The image display apparatus according to claim 1, wherein the optical axis of the projection optical system is aligned with a point where the quantity of leakage light from the polarization splitting film is minimum.

15. The image display apparatus according to claim 1, wherein an optical axis of the illumination optical system forms an angle of 45° with respect to the line normal to the polarization splitting film.

16. The image display apparatus according to claim 5, wherein an optical axis of the illumination optical system forms an angle of 45° with respect to the line normal to the polarization splitting film.

17. The image display apparatus according to claim 7, wherein an optical axis of the illumination optical system forms an angle of 45° with respect to the line normal to the polarization splitting film.

18. The image display apparatus according to claim 8, wherein an optical axis of the illumination optical system forms an angle of 45° with respect to the line normal to the polarization splitting film.

19. The image display apparatus according to claim 9, wherein an optical axis of the illumination optical system forms an angle of 45° with respect to the line normal to the a polarization splitting film.

20. The image display apparatus according to claim 10, wherein an optical axis of the illumination optical system forms an angle of 45° with respect to the line normal to the polarization splitting film.

21. The image display apparatus according to claim 11, wherein an optical axis of the illumination optical system forms an angle of 45° with respect to the line normal to the polarization splitting film.

22. The image display apparatus according to claim 12, wherein an optical axis of the illumination optical system forms an angle of 45° with respect to the line normal to the polarization splitting film.

23. The image display apparatus according to claim 1,
wherein the polarizing beam splitter includes an incident plane opposed to the image display element, and
wherein the optical path of the light beam emerging from the center of the image display element and reaching the point where the optical axis of the projection optical system intersects the optical surface of the projection optical system closest to the image display element is inclined with respect to the incident plane on the section parallel to the line normal to the polarization splitting film and the line normal to the image display element.

24. The image display apparatus according to claim 5,
wherein the first polarizing beam splitter includes a first incident plane opposed to the first image display element, and
wherein the optical path of the light beam emerging from the center of the first image display element and reaching the point where the optical axis of the projection optical system intersects the optical surface of the projection optical system closest to the first image display element is inclined with respect to the first incident plane on the section parallel to the line normal to the first polarization splitting film and the line normal to the first image display element.

25. The image display apparatus according to claim 7,
wherein the polarizing beam splitter includes an incident plane opposed to the image display element, and
wherein the optical path of the light beam emerging from the center of the image display element and reaching the point where the optical axis of the projection optical system intersects the optical surface of the projection optical system closest to the image display element is inclined with respect to the incident plane on the section parallel to the line normal to the polarization splitting film and the line normal to the image display element.

26. The image display apparatus according to claim 8,
wherein the first polarizing beam splitter includes a first incident plane opposed to the first image display element, and
wherein the optical path of the light beam emerging from the center of the first image display element and reaching the point where the optical axis of the projection optical system intersects the optical surface of the projection optical system closest to the first image display element is inclined with respect to the first incident plane on the section parallel to the line normal to the first polarization splitting film and the line normal to the first image display element.

27. The image display apparatus according to claim 9,
wherein the polarizing beam splitter includes an incident plane opposed to the image display element, and
wherein the optical path of the light beam emerging from the center of the image display element and reaching the point where the optical axis of the projection optical system intersects the optical surface of the projection optical system closest to the image display element is inclined with respect to the incident plane on the section parallel to the line normal to the polarization splitting film and the line normal to the image display element.

28. The image display apparatus according to claim 10,
wherein the first polarizing beam splitter includes a first incident plane opposed to the first image display element, and
wherein the optical path of the light beam emerging from the center of the first image display element and reaching the point where the optical axis of the projection optical system intersects the optical surface of the projection optical system closest to the first image display element is inclined with respect to the first incident plane on the section parallel to the line normal to the first polarization splitting film and the line normal to the first image display element.

29. The image display apparatus according to claim 11,
wherein the polarizing beam splitter includes an incident plane opposed to the image display element, and
wherein the optical path of the light beam emerging from the center of the image display element and reaching the point where the optical axis of the projection optical system intersects the optical surface of the projection optical system closest to the image display element is inclined with respect to the incident plane on the section parallel to the line normal to the polarization splitting film and the line normal to the image display element.

30. The image display apparatus according to claim 12,
wherein the first polarizing beam splitter includes a first incident plane opposed to the first image display element, and
wherein the optical path of the light beam emerging from the center of the first image display element and reaching the point where the optical axis of the projection optical system intersects the optical surface of the projection optical system closest to the first image display element is inclined with respect to the first incident plane on the section parallel to the line normal to the first polarization splitting film and the line normal to the first image display element.

* * * * *